2,768,954

LUBRICANT

Ellis K. Fields, Chicago, Ill., assignor to Standard Oil Company, Chicago, Ill., a corporation of Indiana No Drawing. Application December 30, 1952,
Serial No. 328,824

8 Claims. (Cl. 252—46.6)

The present invention concerns petroleum oils containing small amounts of certain organic derivatives of phosphorus sulfide-acyclic hydrocarbon reaction product. More particularly, it is directed to the addition to mineral lubricating oil and the like of compositions prepared by reacting such phosphorus and sulfur- containing product, with a mercapto or hydroxy compound.

It has heretofore been discovered that certain reaction products of a phosphorus sulfide and a hydrocarbon, particularly a hydrocarbon such as an olefin or an olefin polymer, when added to lubricants such as hydrocarbon oil, in small amounts, are effective in inhibiting the formation of varnish, sludge, carbon, and the like during the use of such lubricants. The preparation of such reaction products is described in U. S. 2,315,529, granted to Charles D. Kelso, and in U. S. 2,316,078, granted to Clarence M. Loane and James W. Gaynor, each of which issued on April 6, 1943. It has now been found that by reacting such products with certain organic mercapto or hydroxy compounds valuable antioxidants for use in lubricating oils and the like may be produced.

It is an object of the present invention to provide novel lubricants containing certain phosphorus and sulfur-containing organic derivatives, particularly organic derivatives of phosphorus sulfide-hydrocarbon reaction products, which lubricants are especially resistant to oxidation. A further object is to provide novel organic derivatives of certain phosphorus sulfide-hydrocarbon reaction products which are effective antioxidants in lubricating oils as well as being effective to inhibit the formation of varnish, sludge, carbon, etc. Other objects and advantages of the present invention will become apparent from the following description thereof.

Briefly, the additives of the present invention may be prepared by reacting a phosphorus sulfide-hydrocarbon reaction product, of the type hereinafter referred to in detail, with an organic mercapto or hydroxy compound selected from the group consisting of alcohols, mercaptans, phenols, and thiophenols at a temperature within the range of about 150° to about 500° F. and preferably from about 200° to about 450° F. for at least one-half hour and preferably from about 2 to 100 hours. Ratios of organic mercapto or hydroxy compound to phosphorus sulfide-hydrocarbon reaction product employed in accordance herewith are from about 1 to 5 to about 50 to 1 and preferably from about 1 to 1 to about 10 to 1 by weight. These compositions may be employed in very small amounts in petroleum oils or the like for the purpose of preventing oxidative deterioration of such oils.

Phosphorus sulfide-hydrocarbon reaction products of the type which may be employed in accordance herewith may be readily obtained by reacting a phosphorus sulfide with a hydrocarbon at a temperature of from about 200° F. to about 600° F., and preferably from about 250° F. to about 500° F., using from about 1% to about 50%, and preferably from about 5% to about 25%, by weight, of the phosphorus sulfide in the reaction. It is advantageous to maintain a non-oxidizing atmosphere, such as for example, an atmosphere of nitrogen above the reaction mixture. Usually, it is preferable to use an amount of the phosphorus sulfide that will completely react with the hydrocarbon so that no further purification becomes necessary; however, an excess of phosphorus sulfide can be used and separated from the product by filtration or by dilution with a solvent, such as hexane, filtering and subsequently removing the solvent by suitable means, such as by distillation. The phosphorous sulfide-hydrocarbon reaction products contain both sulfur and phosphorus. The reaction may if desired be carried out in the presence of an additional sulfurizing agent or the phosphorus sulfide-hydrocarbon reaction product can be sulfurized, as described in U. S. 2,316,087, issued April 6, 1943, to James W. Gaynor and Clarence M. Loane.

The hydrocarbon constituent of this reaction is preferably a mono-olefin hydrocarbon polymer resulting from the polymerization of low molecular weight mono-olefinic hydrocarbons or isomono-olefinic hydrocarbons, such as propylene, butylenes, and amylenes or the copolymers obtained by the polymerization of hydrocarbon mixtures containing isomono-olefins and mono-olefins or mixtures of olefins in the presence of a catalyst, such as sulfuric acid, phosphoric acid, boron fluoride, aluminum chloride or other similar halide catalysts of the Friedel-Crafts type.

The polymers employed are preferably mono-olefin polymers or mixtures of mono-olefin polymers and isomono-olefin polymers having molecular weights ranging from about 150 to about 50,000 or more, and preferably from about 300 to about 10,000. Such polymers can be obtained, for example, by the polymerization in the liquid phase of a hydrocarbon mixture containing mono-olefins and isomono-olefins such as butylene and isobutylene at a temperature of from about −80° F. to about 100° F. in the presence of a metal halide catalyst of the Friedel-Crafts types such as, for example, boron fluoride, aluminum chloride, and the like. In the preparation of these polymers I may employ, for example, a hydrocarbon mixture containing isobutylene, butylenes and butanes recovered from petroleum gases, especially those gases produced in the cracking of petroleum oils in the manufacture of gasoline. U. S. 2,407,873 to Evering et al. describes a particularly suitable technique for polymerizing such olefins in the presence of an aluminum-chloride-hydrocarbon complex catalyst.

Essentially paraffinic hydrocarbons such as bright stock residuums, lubricating oil distillates, petrolatums or paraffin waxes may be used. The condensation products of any of the foregoing hydrocarbons or their halogen derivatives, with aromatic hydrocarbons can also be employed.

Examples of high molecular weight olefinic hydrocarbons which can be employed as reactants are cetene ($C_{16}$), cerotene ($C_{26}$), melene ($C_{30}$), and mixed high molecular weight alkenes obtained by cracking petroleum oils. Other olefins suitable for the preparation of the herein described phosphorus sulfide reaction products are olefins having at least 20 carbon atoms in the molecule of which from about 12 carbon atoms to about 18 carbon atoms, and preferably at least 15 carbon atoms, are in a long chain. Such olefins can be obtained by the dehydrogenation of paraffins, such as by the cracking of paraffin waxes, or by the dehalogenation of alkyl halides, preferably long chain alkyl halides, particularly halongenated paraffin waxes. Also, olefins derived from the Synthol or hydrocarobn synthesis process may be employed. These are essentially straight chain compound varying widely in molecular weight.

Also contemplated within the scope of the present invention are the reaction products of a phosphorus sulfide with aromatic hydrocarbons such as benzene, naphthalene, anthracene, toluene, diphenyl, etc. and alkylated aromatic hydrocarbon such as, for example, an alkyl benzene characterized by having at least one alkyl group of at least four carbon atoms, and preferably at least eight carbon atoms such as a long chain paraffin wax.

The phosphorus sulfide reactant can be any phosphorus sulfide, such as for example $P_2S_3$, $P_4S_3$, $P_4S_7$, and preferably $P_2S_5$.

In accordance with the present invention, the mercapto and hydroxy compounds suitable for reaction with the phosphorus sulfide-hydrocarbon reaction products include alcohols, mercaptans, phenols and thiophenols. Examples of alcohols suitable for use are either mono or poly hydroxy alcohols which may be acyclic or alicyclic. Thus, such alcohols as methanol, ethanol, n-propanol, isopropanol, hexanol, octanol, decanol, dodecanol, octadecanol, cyclohexanol, cyclopentanol, benzyl alcohol, ethylene glycol, propylene glycol, glycerine, etc., may be employed.

Examples of the various phenols which may be employed are phenol, cresols, diamylphenol, p-tertiary butylphenol, etc. Similarly, the polyhydroxy phenols and alkyl-substituted polyhydroxy phenols such as hydroquinone, catechol, resorcinol, pyrogallol, hydroxy hydroquinone, etc., may be used.

Suitable mercaptans include both acyclic and alicyclic mercaptans such as methyl, ethyl, butyl, nonyl, lauryl, cyclohexyl, etc. Examples of thiophenols useful in accordance herewith are thiophenol, thiocresol, etc. Mixtures of various mercapto or hydroxy compounds, for example, mercaptans—such as are recovered in petroleum desulfurization processes; alcohols—derived from the so-called Synthol or hydrocarbon synthesis process wherein carbon monoxide and hydrogen are converted catalytically to hydrocarbons and various oxygenated compounds, or from the Oxo process wherein carbon monoxide, hydrogen and olefinic hydrocarbons may be catalytically converted to aldehydes and alcohols; phenols and thiophenols—resulting from caustic washing of petroleum stocks, etc., may be employed. It should be understood that enumeration of certain specific compounds is for purposes of illustration and not of limitation and that other suitable compounds falling within the definition set forth, but specifically unnamed herein, may be employed in accordance herewith.

For purposes of illustrating the method whereby the additives of the present invention may be prepared, the following examples are provided:

*Example 1*

A mixture of 623 grams of an isobutylene polymer having a mean molecular weight of 330 and a specific gravity of .831 and 187 grams of $P_2S_5$ were stirred at 400° F. for 4 hours, during which $H_2S$ evolved. The mixture was cooled to about 270° F., 500 cc. of n-amyl alcohol added, the mixture refluxed at about 300° F. for 72 hours and then stripped in vacuum; 246 cc. of amyl alcohol were recovered. The remaining 787 grams of product was a clear amber, viscous liquid containing 5.3% phosphorus and 10.6% sulfur.

*Example 2*

200 grams of a reaction product of $P_2S_5$ and the isobutylene polymer (prepared in accordance with the method described in Example 1) were reacted with 45.7 grams 2-butyl-2-ethyl-1,3-propanediol at a temperature of 320° F. for 16 hours. The product was stripped in vacuum at about 300° F. to give a residue of 222 grams of clear light amber viscous liquid containing 4.84% phosphorus and 8.39% sulfur. A portion of this product was added to a highly refined white oil in a concentration of 0.1% by weight and the white oil was subjected to an oxidation test for a period of 510 hours before failure. A white oil alone without the added inhibitor oxidized (failed) in the same test in about 50 hours.

*Example 3*

Eighty-four grams $P_2S_5$-isobutylene polymer reaction product (prepared as in Example 1) and 40 cc. nonyl alcohol (resulting from oxoation of isobutylene codimer and having specific gravity of .838) were heated together at 320° F. to 350° F. for 20 hours. The product was stripped in vacuo and filtered hot, giving 104 g. of a clear, viscous, amber, pleasant smelling liquid analyzing 5.8% phosphorus and 9.7% sulfur.

*Example 4*

42.5 grams $P_2S_5$-isobutylene polymer reaction product (prepared as in Example 1) and 40.4 g. n-dodecyl mercaptan were heated at 365° to 400° F. for 23 hours. The product was stripped in vacuo, giving 50.9 grams clear brown liquid which analyzed 6.1% phosphorus and 11.8% sulfur.

*Example 5*

Eighty-five grams $P_2S_5$-isobutylene polymer reaction product (prepared as in Example 1) and 75 grams phenol were refluxed for 40 hours, then stripped in vacuo. The product was a clear brown viscous liquid weighing 92 grams and analyzing 7.1% phosphorus and 10.9% sulfur.

*Example 6*

A mixture comprising 85% isobutylene polymer (mean molecular weight 780, viscosity 1010 S. S. U. at 210° F. and specific gravity .881) and 15% $P_2S_5$, was stirred at 400°–440° F. for 6 hours. 140 g. of this product and 30 cc. n-hexanol was heated at 160°–170° C. for 20 hours, then stripped in vacuo, giving 153 g. clear amber viscous liquid analyzing 3.2% phosphorus and 5.7% sulfur.

*Example 7*

A mixture of 832 cc. decene-1 and 444.5 g. $P_2S_5$ was stirred at 360°–380° F. for 3½ hours. 25.1 g. of this product and 62.2 cc. n-hexanol were refluxed 16 hours, then stripped in vacuo. The product, 35 g., was a pleasant smelling, viscous, greenish-brown liquid analyzing 7.8% phosphorus and 15.3% sulfur.

The oxidation test referred to in Example 2 is conducted as follows: A mixture of 300 cc. of oil and 60 cc. water is heated at 95° C. with a one meter coil of polished copper wire and a similar coil of iron while pure oxygen is bubbled in at a rate of 3 liters per hour. Aliquots are taken at regular intervals and titrated for acidity. The point at which the acidity reaches 2 mg. of KOH is called the breakdown point.

A reaction product of the mercapto or hydroxy compound with the phosphorus sulfide-hydrocarbon reaction product may be added in accordance with the present invention to mineral oils in general and highly refined white oils or lubricating oils in particular in an amount of from about .01% to about 5% and preferably from about .05% to about 2%. Other lubricant additives such as extreme pressure agents, oiliness agents, viscosity index improvers, etc. may be employed in conjunction with the additive of the present invention without in any way departing from the scope thereof.

The phosphorus sulfide-hydrocarbon reaction products employed in accordance herewith are unneutralized products. Thus "unneutralized phosphorus sulfide-hydrocarbon reaction products," when referred to herein, shall mean such products which have not had as much as 1% of their titratable acidity neutralized by reaction with a basic reagent.

It is common practice to market additives of this general type as concentrates in a hydrocarbon oil. Such products are sold to lubricant manufacturers as compositions containing as much as 50% or more of the additive in an oil. Compositions of this type are within the scope of the present invention.

Having thus described my invention, what I claim as novel and desire to protect by Letters Patent is as follows:

1. A composition comprising a petroleum lubricating oil and from about 0.01% to about 5% of an oil soluble material obtained by reacting in a ratio of from about 1:5 to about 10:1 parts by weight of a compound selected from the group consisting of alcohols, phenols, mercaptans, and thiophenols with an unneutralized product of a phosphorus sulfide and a polymer of a mono-olefinic hydrocarbon of less than 6 carbon atoms, which polymer has a molecular weight in the range of from about 150 to 50,000, at a temperature in the range of from about 150° F. to about 500° F.

2. The composition of claim 1 wherein the phosphorus sulfide is $P_2S_5$.

3. The composition of claim 1 wherein the polymer of a mono-olefinic hydrocarbon is an isobutylene polymer.

4. A lubricant comprising a mineral lubricating oil and from about 0.01% to about 5% of an oil soluble material obtained by reacting in a ratio of from about 1:5 to about 10:1 parts by weight of an unneutralized product of a phosphorus sulfide and a co-polymer of an isomono-olefin and a normal mono-olefin, said olefins having less than 6 carbon atoms and said copolymer having a molecular weight of from about 150 to about 5000, with a compound selected from the group consisting of alcohols, phenols, mercaptans, and thiophenols at a temperature in the range of from about 150° F. to about 500° F.

5. A lubricant comprising a mineral lubricating oil and from about 0.01% to about 5% of an oil soluble material obtained by reacting in a ratio of from about 1:5 to about 10:1 parts by weight of an unneutralized product of a phosphorus sulfide and a co-polymer of an isomono-olefin and a normal mono-olefin, said olefins having less than 6 carbon atoms and said co-polymer having a molecular weight of from about 150 to about 50,000, with an alcohol at a temperature in the range of from about 150° F. to about 500° F.

6. A lubricant comprising a mineral lubricating oil and from about 0.01% to about 5% of an oil soluble material obtained by reacting in a ratio of from about 1:5 to about 10:1 parts by weight of an unneutralized product of a phosphorus sulfide and a co-polymer of an isomono-olefin and a normal mono-olefin, said olefins having less than 6 carbon atoms and said co-polymer having a molecular weight of from about 150 to about 50,000, with a phenol at a temperature in the range of from about 150° F. to about 500° F.

7. A lubricant comprising a mineral lubricating oil and from about 0.01% to about 5% of an oil soluble material obtained by reacting in a ratio of from about 1:5 to about 10:1 parts by weight of an unneutralzed product of a phosphorus sulfide and a co-polymer of an isomono-olefin and a normal mono-olefin, said olefins having less than 6 carbon atoms and said co-polymer having a molecular weight of from about 150 to about 50,000, with a mercaptan at a temperature in the range of from about 150° F. to about 500° F.

8. A lubricant comprising a mineral lubricating oil and from about 0.01% to about 5% of an oil soluble material obtained by reacting in a ratio of from about 1:5 to about 10:1 parts by weight of an unneutralized product of a phosphorus sulfide and a co-polymer of an isomono-olefin and a normal mono-olefin, said olefins having less than 6 carbon atoms and said co-polymer having a molecular weight of from about 150 to about 50,000, with a thiophenol at a temperature in the range of from about 150° F. to about 500° F.

References Cited in the file of this patent

UNITED STATES PATENTS

| | | |
|---|---|---|
| 2,392,252 | May | Jan. 1, 1946 |
| 2,619,462 | Beare et al. | Nov. 25, 1952 |
| 2,640,053 | Hill | May 26, 1953 |